F. J. McCANDLESS.
VEHICLE WHEEL.
APPLICATION FILED JUNE 4, 1914.
1,167,307.
Patented Jan. 4, 1916.
2 SHEETS—SHEET 1.
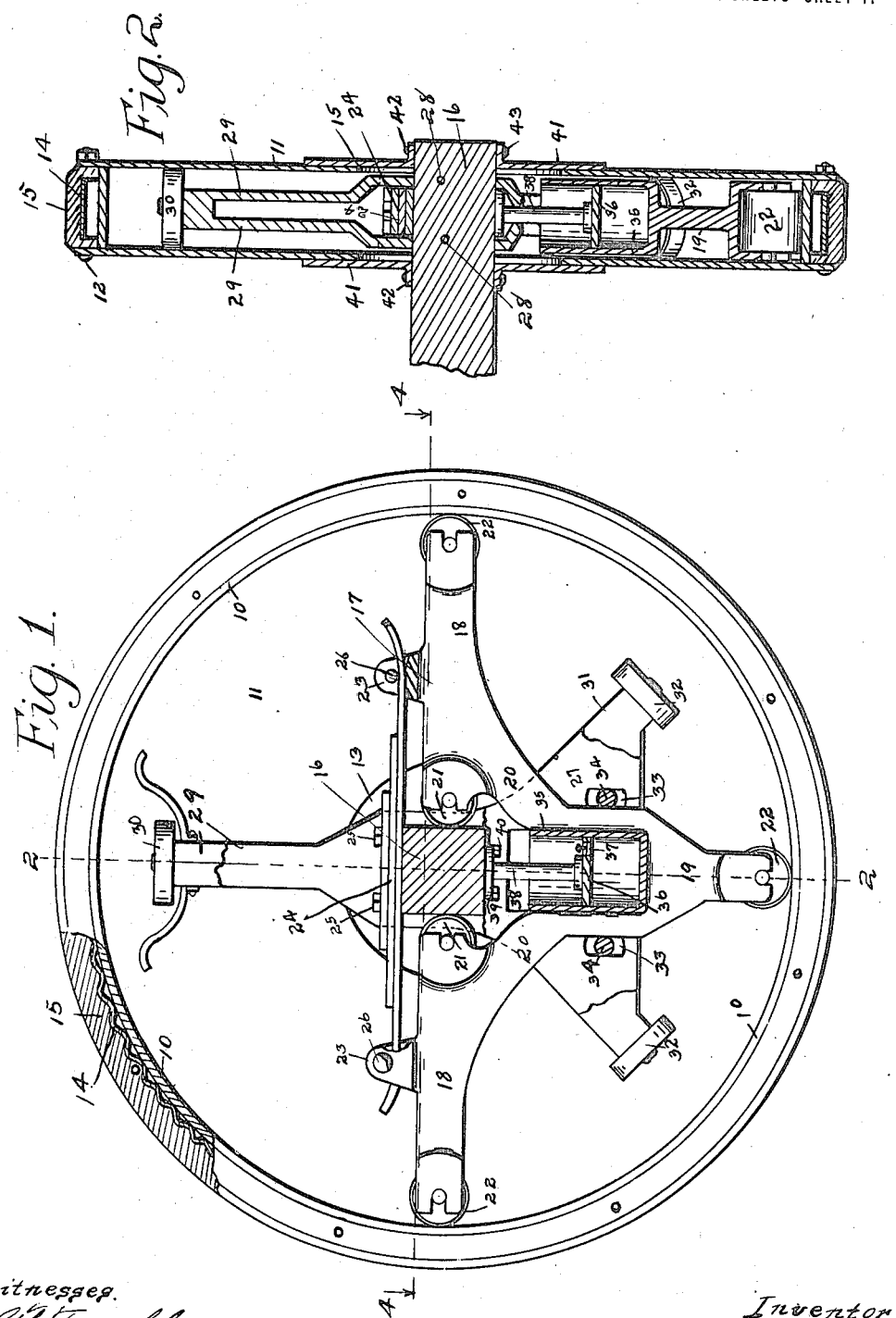
Witnesses.
G. H. Turcheh
Will Freeman
Inventor
Frank J. McCandless.
By Orwig & Bair.
Attys.

F. J. McCANDLESS.
VEHICLE WHEEL.
APPLICATION FILED JUNE 4, 1914.

1,167,307.

Patented Jan. 4, 1916.
2 SHEETS—SHEET 2.

Witnesses:

Inventor,
Frank J. McCandless
By Orwig & Bair
Atty's

UNITED STATES PATENT OFFICE.

FRANK JAMES McCANDLESS, OF CHARITON, IOWA.

VEHICLE-WHEEL.

1,167,307.     Specification of Letters Patent.      Patented Jan. 4, 1916.

Application filed June 4, 1914. Serial No. 843,031.

*To all whom it may concern:*

Be it known that I, FRANK J. McCANDLESS, a citizen of the United States, residing at Chariton, in the county of Lucas and State of Iowa, have invented a certain new and useful Improved Vehicle-Wheel, of which the following is a specification.

The object of my invention is to provide a wheel of simple, durable and inexpensive construction so constructed that the shock absorbing devices for the vehicle may be inclosed within the wheel so that the bearing members of the devices may be protected from dust and dirt; and furthermore that the said devices may be supplied with plenty of lubrication.

A further object is to provide a wheel comprising a cylindrical casing so constructed that the supporting members for the shaft and the shock absorbing devices may be contained within the casing which is designed to receive grease or any lubricating material; and to provide means in connection with the casing for sealing the opening or openings therein through which the axle extends, to prevent the escape of grease contained within the casing and also to prevent the dirt and foreign substances from entering the casing from the outside.

A further object is to provide a wholly inclosed wheel in which the shock absorbing devices are contained, and to therewith provide a supporting frame for the axle to carry the weight thereof so constructed that the axle is free to move upwardly and downwardly relative to said frame; and further to provide a second frame rigidly secured to the axle and slidably mounted relative to the first frame for the purpose of supporting the wheel in a vertical position relative to said axle.

A further object is to provide an improved shock absorbing device to be used in connection with vehicle wheels which may be inclosed within a grease-tight casing formed within the wheel.

A further object is to provide improved means for securing a resilient tire to a vehicle wheel.

The further objects and advantages of this invention will be evident from the following description.

Figure 4:
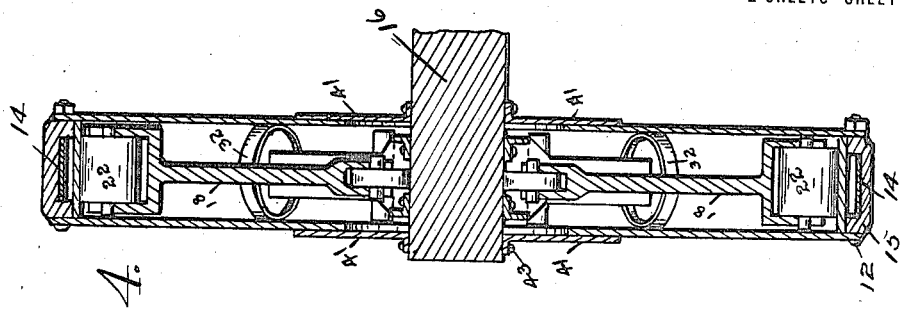
Figure 3:
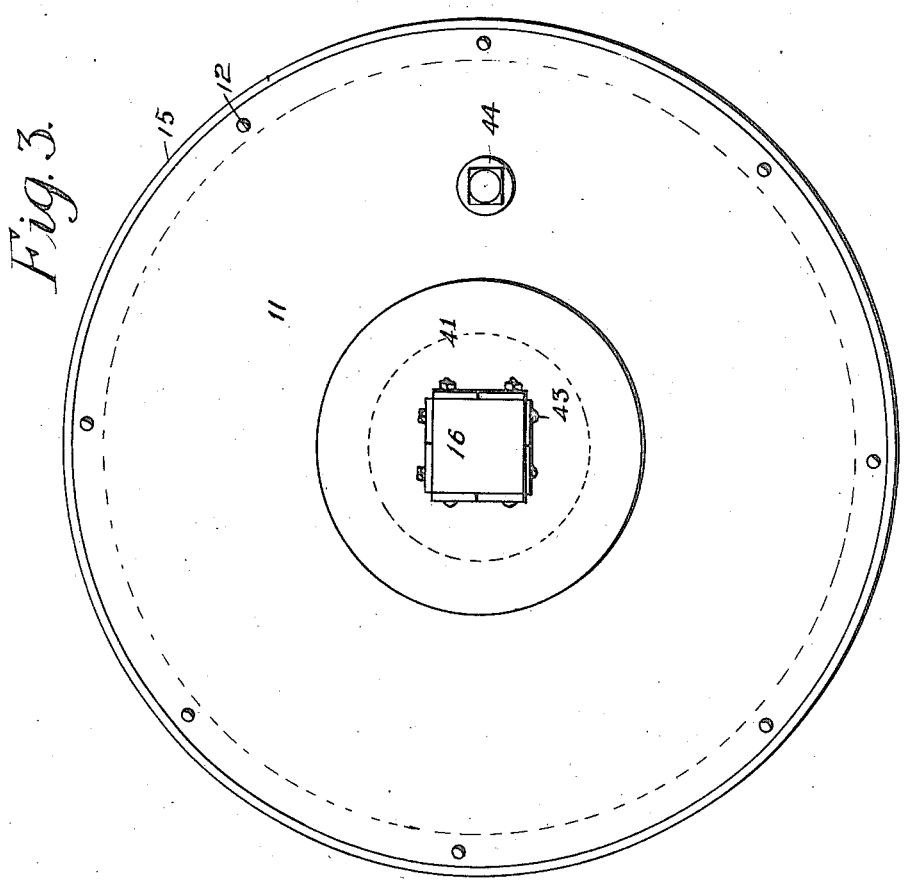

My invention consists in certain details, in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of my improved wheel with one of the side plates removed and portions of the device broken away to show the details of construction. Fig. 2 shows a vertical, sectional view taken on the line 2—2 of Fig. 1. Fig. 3 shows a side elevation of the wheel complete, and Fig. 4 shows a plan, sectional view taken on the line 4—4 of Fig. 1.

Referring to the accompanying drawings, it will be seen that my new and improved wheel comprises a cylindrical member having plates 11 secured thereto by any suitable means such as bolts 12. Each of the plates 11 is provided at its central portion with an opening 13 through which the axle extends, as will hereinafter be more fully set forth. The plates 11 are made considerably larger in diameter than the cylindrical member 10 so as to form a channel between them and the member 10. This channel receives a corrugated member 14 extending around the member 10. Received in the channel and preferably secured to the member 14 is a resilient tire 15. The transverse section of the corrugated member 14 is somewhat shorter than the width of the channel between the plates 11 so that a portion of the tire 15 may extend down beyond the ends of the member 14, as clearly illustrated in Fig. 2. This tire is held in position by means of the bolts 12 which extend through openings in the member 15 provided for the same. The bolts 12 also secure the plates 11 in position. By this construction, it will be seen that I have provided a tire which will not slip upon the wheel on account of the corrugated member 14. The openings 13 in the plates 11 are designed to receive the axle 16 of a vehicle.

It should be understood that one of the plates 11 may be made without the opening 13 and that the axle 16 may extend through the other plate 11 to a point just inside of the solid plate 11. In that case the plate 41 on one side may be dispensed with.

For supporting the axle 16 and imparting movement to the wheel, I have provided a frame 17 which comprises rearwardly and forwardly extending horizontal arms 18 and a perpendicular arm 19. The arms 18 are so mounted as to be substantially in a horizontal line with the center of the wheel or casing and the perpendicular arm is arranged perpendicularly beneath the center of the axle. The horizontal arms and perpendicular arm are connected together by means of the U-shaped member 20 so that altogether they form a rigid frame. Each of the inwardly extending portions of the arms 18 is provided with a roller 21 which is designed to engage the sides of the axle to reduce the friction between the axle and the ends of said arms.

To reduce the friction between the outer ends of the arms 18 and 19 and the cylindrical member 10, I have provided the rollers 22. The upper sides of the arms 18 are provided with upwardly extending bifurcated lugs 23 which are designed to receive a spring 24. The central portion of this spring 24 is secured to the axle 16 by means of bolts 25. To prevent the spring 24 from bouncing out of the bifurcated members 23, I have provided pins 26.

To support the wheel in a vertical position relative to the axle 16, I have provided a divided frame 27 having its side portions extending on each side of the frame 17 and slidingly mounted therewith. The divided frame 27 is rigidly secured to the axle 16 by means of bolts 28 and is provided with upwardly extending portions 29, the upper ends of which are rigidly connected together and designed to carry a horizontally arranged wheel 30. This wheel is of slightly smaller diameter than the distance between the plates 11 and is designed to engage said plates for the purpose of holding them in a vertical position relative to the axle.

Each of the frames 27 is provided with two oblique downwardly extending members 31, the lower ends of which are connected together in the same manner as the members 29 and are designed to carry rollers 32 similar to the roller 30.

It will be seen from the construction just described that by means of the frame 27 rigidly secured to the axle 16 the plates 11 will be securely supported in a position perpendicular to said axle and at the same time so constructed as to permit a free up and down movement of the said axle relative to the supporting frame 17.

It will be seen that the members 29 and 31 are considerably shorter than the radius of the cylindrical member 10 to permit an up and down movement of said parts without engaging said cylindrical member.

I have provided slots 33 in the members 27 near their lower portion spaced apart from each other so as to be in line with the forward and rearward sides of the member 19. Extending through the slots in the members of one side, to the slots in the members of the opposite side, I have provided rollers 34. These rollers are designed to engage the sides of the member 19 to form a bearing therewith so that the arms 18 of the frame 17 and the arm 19 will be held in their proper positions against the tendency to rotate with the member 10. The slots 33 are considerably longer than the diameter of the rollers 34 in order to permit the rollers to travel in said slots as the frame 27 slides upwardly and downwardly relative to the frame 17.

Secured in the central portion of the arm 19, I have provided a vertically arranged cylinder 35 having its upper end slightly below the axle 16.

Slidingly mounted within the cylinder 35 is a piston 36 having a check valve 37. The piston 36 is provided with an upwardly extending shaft 38, the upper end of which is connected to the lower side of the axle 16 by means of the flange 39 and the cap bolts 40. The valve 37 is so arranged that as the axle 16 moves downwardly the valve will be closed, thereby forming an air cushion between the piston 36 and the cylinder 35. When the piston 36 moves upwardly the valve 37 will open and permit air to enter the cylinder to replace any air that may have leaked out through the downward stroke. The cylinder 35 and the mechanism connected therewith is provided for the purpose of forming a shock absorber in connection with the spring 24. It does not necessarily need to be used in connection with the rest of the device although it would be desirable in case the wheel was attached to automobiles or vehicles of that class.

To prevent grease from working through the opening 13 and to prevent dust from working in through said openings, I have provided a disk 41 designed to be placed adjacent to the outer sides of each of the plates 11, and of a diameter considerably larger than the opening 13. Each of these disks is provided with a square opening at its central portion and an outwardly extending flange 42. This flange 42 is bolted to the axle 16 by means of bolts 43. Thus, it will be seen that a comparatively tight joint will be formed between the inner sides of the disk 41 and the outer surfaces of the plates.

When it is desired to remove the wheel, the bolts 43 may be removed from the outer end of the axle and the outer disk removed, after which one of the plates 11 may be removed, thereby permitting free access to the mechanism inside of the wheel.

In one side of one of the plates 11, I have provided an opening, through which grease may be placed within the casing, having a plug 44.

It will be understood that sprockets or gear wheels may be applied to the plates 11 in case the wheel should be used on traction machinery. Furthermore, it will be seen that a wheel of this nature could be built of sheet metal which would not be subject to expansion and contraction as is the case with the wooden wheel; and furthermore by employing the plates 11 for supporting the tire instead of spokes, the device would be better adapted for soft and muddy ground.

The wheel illustrated in the drawings is of comparatively narrow width, but the wheel could be built with a wider tire to adapt it for soft ground.

Another advantage of my device is that the springs and the bearings connected therewith are within the grease-tight casing which will at all times contain grease. Further, the weight of the axle is carried at a point close to the ground. This prevents lateral strains which would be developed in a wheel having the weight carried in the central portion thereof.

I claim as my invention:

1. In a device of the class described, a cylindrical casing, an axle extended into the central portion thereof, a supporting frame within the casing having rollers to engage the inner periphery of said casing, a second frame slidably mounted with the first frame and having rollers to engage the inner end faces of said casing, means for securing the second frame to said axle, and yielding means for carrying the axle from the supporting frame.

2. In combination with a vehicle axle, a cylindrical casing having end plates, the axle being extended into said casing, a spring for said axle, a supporting frame within said casing for carrying said spring, rollers in said frame to engage the inner periphery of said cylinder, a cylinder on said supporting frame, a piston therein having a check valve and having a stem supporting said axle, a second frame secured to said axle to support the casing in vertical position relative to the axle, rollers on said second frame to engage between the end plates, and plates secured to said axle adjacent to the opening on said end plates.

3. In a device of the class described, a cylindrical casing having side members, an axle extended into said casing and capable of vertical movement with relation thereto, a frame within said casing having laterally extending arms, rollers in said arms to engage the inner surface of the periphery of said casing, rollers carried by said arms to engage said axle, a downwardly extending arm connected with said laterally extending arms, a roller thereon to engage the inner periphery of said casing, and a spring device for supporting said axle on said frame.

4. In a device of the class described, a cylindrical casing having side members, an axle extended into said casing and capable of vertical movement with relation thereto, a frame within said casing having laterally extending arms, rollers in said arms to engage the inner surface of the periphery of said casing, rollers carried by said arms to engage said axle, a downwardly extending arm connected with said laterally extending arms, a roller thereon to engage the inner periphery of said casing, a spring device for supporting said axle on said frame, a second frame within said casing secured to said axle and having a plurality of arms, and arms carried by said rollers for engaging the side of said casing.

5. In a device of the class described, a casing, a frame therein having laterally extending arms and a downwardly extending arm, rollers carried by said arms for engaging the inner periphery of said casing, a cylinder formed in the upper surface of the downwardly extending arm, a piston therein, and a stem on said piston secured to said axle.

6. In a device of the class described, a casing, a frame therein having laterally extending arms and a downwardly extending arm, rollers carried by said arms for engaging the inner periphery of said casing, a cylinder formed in the upper surface of the downwardly extending arm, a piston therein, a stem on said piston secured to said axle, and rollers carried by said laterally extending arms for engaging said axle.

Des Moines, Iowa, May 20, 1914.

FRANK JAMES McCANDLESS.

Witnesses:
HARRY E. ROBINSON,
JAMES F. McKNIGHT.